US011689385B2

(12) United States Patent
Hwang et al.

(10) Patent No.: US 11,689,385 B2
(45) Date of Patent: Jun. 27, 2023

(54) HOME APPLIANCE, TERMINAL DEVICE, AND WIRELESS CONNECTION METHOD THEREOF

(71) Applicant: Samsung Electronics Co., Ltd., Suwon-si (KR)

(72) Inventors: Taehwan Hwang, Suwon-si (KR); Youngwook Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 17/309,355

(22) PCT Filed: Oct. 30, 2019

(86) PCT No.: PCT/KR2019/014486
§ 371 (c)(1),
(2) Date: May 20, 2021

(87) PCT Pub. No.: WO2020/138686
PCT Pub. Date: Jul. 2, 2020

(65) Prior Publication Data
US 2022/0021554 A1    Jan. 20, 2022

(30) Foreign Application Priority Data
Dec. 26, 2018    (KR) .................. 10-2018-0169054

(51) Int. Cl.
*H04L 12/28*    (2006.01)
*H04W 76/10*    (2018.01)
(Continued)

(52) U.S. Cl.
CPC ........ *H04L 12/2827* (2013.01); *H04L 12/281* (2013.01); *H04L 12/2825* (2013.01);
(Continued)

(58) Field of Classification Search
CPC ............... H04L 12/2827; H04L 12/281; H04L 12/2825; H04L 2012/284; H04W 48/08; H04W 76/10; H04W 88/06; H04W 88/10
See application file for complete search history.

(56) References Cited

U.S. PATENT DOCUMENTS 9,167,524 B2   10/2015 Nikiforov
10,228,671 B2   3/2019 Ha
(Continued)

FOREIGN PATENT DOCUMENTS

CN    108833228 A    11/2018
JP    5407394 B2    10/2018
(Continued)

OTHER PUBLICATIONS

International Search Report and Written Opinion of the International Searching Authority dated Feb. 14, 2020 in connection with International Application No. PCT/KR2019/014486, 13. pages.
(Continued)

*Primary Examiner* — Tejal Gami

(57) ABSTRACT

A home appliance is disclosed. The disclosed home appliance comprises: a communication device for performing communication using a plurality of communication methods; and a processor for, when wireless identification information of a home appliance is received from an external server via a first communication method, controlling the communication device to operate in an access point (AP) mode in which communication is performed in a second communication method by using the received wireless identification information, wherein the processor is connected to a terminal device via the second communication method, and if wireless configuration information for an access point accessed by the terminal device is received from the terminal device, the processor controls the communication device
(Continued)

to access the access point via a third communication method by using the received wireless configuration information.

11 Claims, 11 Drawing Sheets

(51) Int. Cl.
    *H04W 48/08*     (2009.01)
    *H04W 88/06*     (2009.01)
    *H04W 88/10*     (2009.01)

(52) U.S. Cl.
    CPC ........... *H04W 48/08* (2013.01); *H04W 76/10* (2018.02); *H04W 88/06* (2013.01); *H04W 88/10* (2013.01); *H04L 2012/2841* (2013.01)

(56) References Cited

U.S. PATENT DOCUMENTS

| | | | |
|---|---|---|---|
| 10,904,028 | B2 | 1/2021 | Jang et al. |
| 2013/0325939 | A1 | 12/2013 | Shim et al. |
| 2015/0139025 | A1* | 5/2015 | Lee .................. H04W 12/06 370/254 |
| 2016/0373270 | A1 | 12/2016 | Yang et al. |
| 2017/0171794 | A1 | 6/2017 | Meng et al. |

FOREIGN PATENT DOCUMENTS

| | | |
|---|---|---|
| KR | 10-1276861 B1 | 6/2013 |
| KR | 10-2013-0084014 A | 7/2013 |
| KR | 10-2014-0059724 A | 5/2014 |
| KR | 10-2015-0092873 A | 8/2015 |
| KR | 10-1867813 B1 | 6/2018 |
| KR | 10-1870875 B1 | 6/2018 |
| KR | 10-1980039 B1 | 5/2019 |

OTHER PUBLICATIONS

Huawei, NB-IoT, Commercial Premier Use Case Library, Issue 1.0, 2017, 17 pages.

Singhal, et al., "Degree Certificate Authentication using QR Code and Smartphone," International Journal of Computer Applications (0975 -8887), vol. 120, No. 16, Jun. 16, 2015, 6 pages.

Wenbo, et al., "Smart Home Implementation Based on Internet and WiFi Technology," Proceedings of the 34th Chinese Control Conference, Hangzhou, China, Jul. 28-30, 2015, 7 pages.

\* cited by examiner

HOME APPLIANCE, TERMINAL DEVICE, AND WIRELESS CONNECTION METHOD THEREOF

CROSS-REFERENCE TO RELATED APPLICATIONS

This application is a 371 National Stage of International Application No. PCT/KR2019/014486, filed Oct. 30, 2019, which claims priority to Korean Patent Application No. 10-2018-0169054, filed Dec. 26, 2018, the disclosures of which are herein incorporated by reference in their entirety.

BACKGROUND

1. Field

The disclosure relates to a home appliance, a terminal device, and a wireless connection method thereof, and more particularly, to a home appliance that is capable of easily configuring a home appliance for a plurality of communication networks, a terminal device, and a wireless connection method thereof.

2. Description of the Related Art

Home appliances can perform various functions according to control commands of users. Recent home appliances support wireless connection, and can be connected to a network for receiving control commands from various terminal devices.

In the past, a home appliance could be connected to a wireless LAN by using wireless configuration information received from a terminal device, or a home appliance could be directly connected to a mobile communication network.

However, there was a problem that, in order that a home appliance could be connected to a wireless LAN, a separate wireless configuration operation had to be performed by a user, and also, there was a problem that in the process of receiving wireless configuration information from a terminal device, information of a home appliance was exposed.

Also, in case a home appliance was connected to a mobile communication network, there was a problem that a charge was incurred because a network of a telecommunications company had to be used, and the speed was slow.

SUMMARY

The purpose of the disclosure is in providing a home appliance that is capable of easily configuring a home appliance for a plurality of communication networks, a terminal device, and a wireless connection method thereof.

A home appliance according to an embodiment of the disclosure includes a communication device for performing communication using a plurality of communication methods, and a processor for, based on receiving wireless identification information of the home appliance from an external server via a first communication method, controlling the communication device to operate in an access point (AP) mode in which communication is performed in a second communication method by using the received wireless identification information, wherein the processor may be connected to a terminal device via the second communication method, and based on receiving wireless configuration information for an access point accessed by the terminal device from the terminal device, control the communication device to access the access point via a third communication method by using the received wireless configuration information.

Meanwhile, a terminal device according to an embodiment of the disclosure includes a communication device for performing communication using a plurality of communication methods, a memory for storing wireless configuration information for an access point accessed by the terminal device, and a processor for, based on acquiring device information of a home appliance, controlling the communication device to transmit the device information to an external server via a first communication method, wherein the processor may, based on receiving wireless identification information of the home appliance from the external server via the first communication method, control the communication device to access the home appliance via a second communication method by using the received wireless identification information, and transmit the wireless configuration information for the access point to the home appliance via the second communication method.

Meanwhile, a wireless connection method of a home appliance according to an embodiment of the disclosure may include the steps of receiving wireless identification information of the home appliance from an external server via a first communication method, operating in an access point (AP) mode in which a second communication method is used by using the received wireless identification information, connecting to a terminal device via the second communication method, receiving wireless configuration information for an access point accessed by the terminal device from the terminal device, and accessing the access point via a third communication method by using the received wireless configuration information.

Meanwhile, a wireless connection method of a terminal device according to an embodiment of the disclosure may include the steps of storing wireless configuration information for an access point accessed by the terminal device, acquiring device information of a home appliance, transmitting the device information to an external server via a first communication method, receiving wireless identification information of the home appliance from the external server via the first communication method, accessing the home appliance via a second communication method by using the received wireless identification information, and transmitting the wireless configuration information for the access point to the home appliance via the second communication method.

DETAILED DESCRIPTION

Figure 1:
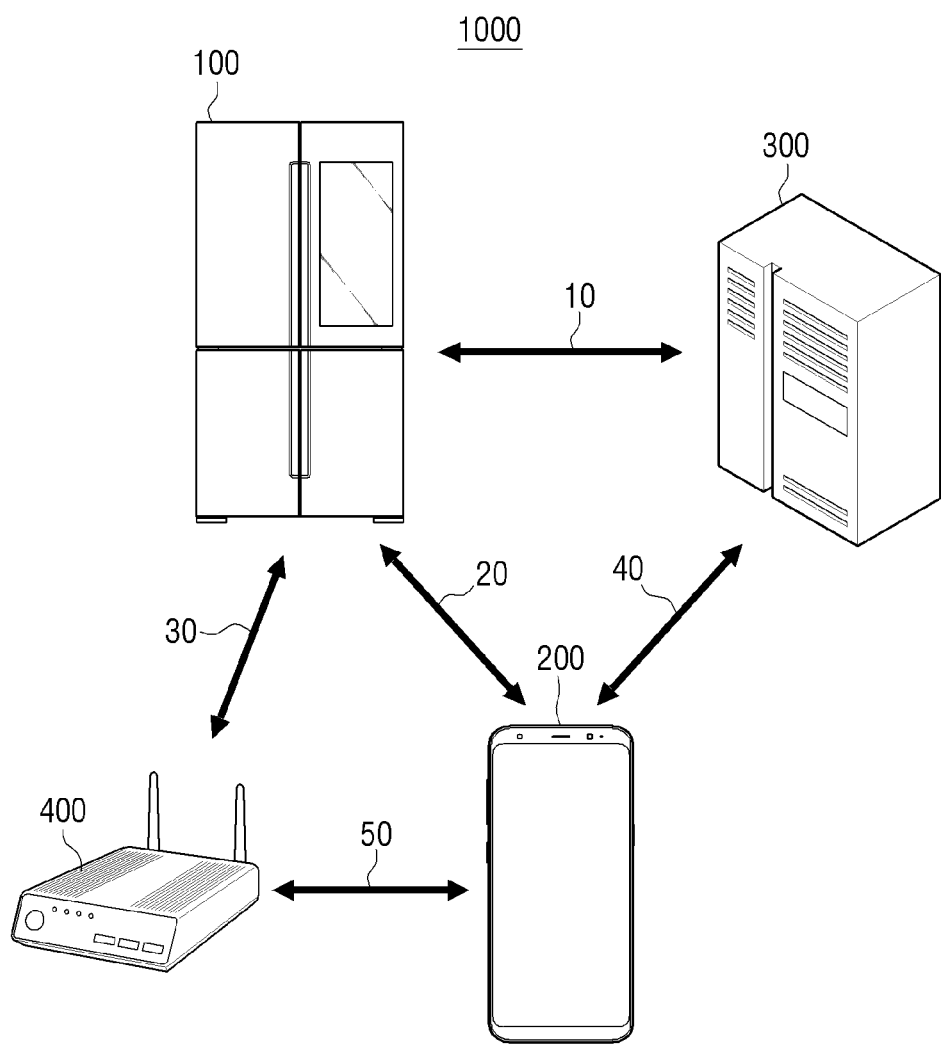
FIG. 1 is a diagram illustrating a wireless configuration system according to an embodiment of the disclosure.

First, terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies. Also, in particular cases, there are terms that were designated by the applicant on his own, and in such cases, the meaning of the terms will be described in detail in the relevant descriptions in the disclosure. Thus, the terms used in the disclosure should be defined based on the meaning of the terms and the overall content of the disclosure, but not just based on the names of the terms.

Also, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing embodiments, detailed explanation of related known technologies may confuse the gist of the disclosure, the detailed explanation will be omitted.

In addition, terms such as "first," "second," and the like may be used to describe various elements, but the terms are not intended to limit the elements. Such terms are used only to distinguish one element from another element.

Further, singular expressions include plural expressions, as long as they do not obviously mean differently in the context. In addition, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly.

Hereinafter, the disclosure will be described in more detail with reference to the accompanying drawings.

FIG. 1 is a diagram illustrating a wireless configuration system according to an embodiment of the disclosure.

Referring to FIG. 1, a wireless configuration system 1000 consists of a home appliance 100, a terminal device 200, a server 300, and an access point 400.

The home appliance 100 is an electric machine tool used in homes, and it may be a robot cleaner, a vacuum cleaner, an electric range, a gas range, a microwave oven, a range hood, a washing machine, a dryer, a refrigerator, a dishwasher, an air conditioner, etc.

The home appliance 100 may perform communication through a plurality of communication methods. For example, the home appliance 100 may perform communication by using mobile communication networks including a Low Power Wireless Network (LPWN) and a Low Power Wide Area Network (LPWAN) such as NB-IoT, LoRa, SigFox, and LTE-CAT1 as well as 3G, LTE, and 5G, or by using a wireless local area network (LAN) such as WiFi 802.11a/b/g/n as well as a wired LAN, or by using communication methods such as NFC and Bluetooth.

The home appliance 100 may receive wireless identification information and a token corresponding to the home appliance 100 from the server 300 via a first communication method 10. Here, the first communication method 10 may be a communication method using a mobile communication network. Also, the wireless identification information of the home appliance 100 means information including at least one of an SSID or a password of the home appliance 100. Further, the token may be used when determining whether the server 300 will grant a right to manage regarding the home appliance 100 to a specific terminal device.

Then, the home appliance 100 may operate in an access point (AP) mode wherein a second communication method 20 is used by using the wireless identification information. Here, the second communication method 20 may be a communication method using Wi-Fi Direct. Also, the AP mode may be a Hidden AP mode wherein the SSID is not known.

Then, the home appliance 100 may be connected to the terminal device 200 via the second communication method 20 while operating in the AP mode. Then, the home appliance 100 may receive wireless configuration information for the access point 400 to which the terminal device 200 is connected from the terminal device 200. Here, the wireless configuration information may include at least one of the SSID or the password of the access point 400.

Then, the home appliance 100 may transmit the token corresponding to the home appliance 100 to the terminal device 200 via the second communication method 20.

Then, the home appliance 100 may convert from the AP mode to a Station mode wherein it can access the access point 400, and access the access point 400 via a third communication method 30 by using the received wireless configuration information. Here, the third communication method may be a communication method using a wireless LAN.

The detailed operations and components of the home appliance 100 as above will be described later with reference to FIG. 2 and FIG. 3.

The terminal device 200 may include a portable terminal or a fixed terminal. A portable terminal is an electronic device that can be easily carried, and it may be a video phone, a mobile phone, a smart phone, a Wideband Code Division Multiple Access (WCDMA) user terminal device, a Universal Mobile Telecommunication Service (UMTS) user terminal device, a Personal Digital Assistant (PDA), a Portable Multimedia Player (PMP), a Digital Multimedia Broadcasting (DMB) user terminal device, an E-book, a portable computer (a notebook, a tablet, etc.), or a digital camera, etc. Meanwhile, a fixed terminal may be a personal desktop computer, a smart TV, etc.

The terminal device 200 may be connected with the access point 400 through wireless LAN communication 50. Also, the terminal device 200 may store wireless configuration information for the access point 400 that it accessed. In case the terminal device 200 has a history of accessing a plurality of access points, the terminal device 200 may store wireless configuration information for the plurality of respective access points. The wireless configuration information may include at least one of the SSID or the password of the access point.

Then, the terminal device 200 may acquire device information of the home appliance 100 and transmit the device information to the server 300 through communication 40 with the server 300. Here, the device information is unique information that can be used for specifying the home appliance. For example, the device information may include a unique serial number or a Universally Unique Identifier (UUID), but is not limited thereto.

Specifically, the terminal device 200 may acquire device information of the home appliance 100 by receiving input of device information of the home appliance 100 from a user, or photographing the QR code of the home appliance 100. Then, the terminal device 200 may transmit the acquired device information of the home appliance 100 to the server 300. Here, communication with the server 300 may be performed through a mobile communication network, or performed by way of the access point 400 accessed by the terminal device 200.

Then, the terminal device 200 may receive wireless identification information corresponding to the device information of the home appliance 100 transmitted to the server 300 from the server 300.

Then, the terminal device 200 may access the home appliance 100 via the second communication method by using the received wireless identification information. Here, the second communication method may be a communication method using Wi-Fi Direct.

Then, the terminal device 200 may transmit the wireless configuration information for the access point 400 to the home appliance 100 via the second communication method.

Then, the terminal device 200 may receive a token corresponding to the home appliance 100 from the home appliance 100. Then, the terminal device 200 may transmit the received token to the server 300 again, and request a right to manage regarding the home appliance 100. Then, when the terminal device 200 is granted the right to manage regarding the home appliance 100 from the server 300, the terminal device 200 may perform management for the home appliance 100 through communication.

The detailed operations and components of the terminal device 200 as above will be described later with reference to FIG. 4 and FIG. 5.

The server 300 means a computer (server computer) or a program (server program) that provides information or services to a client through a network. The server 300 may store device information of a plurality of home appliances.

Also, when the server 300 receives a request signal of wireless identification information from the home appliance 100, the server 300 may generate wireless identification information and a token corresponding to the home appliance 100, and transmit the generated wireless identification information and token to the home appliance 100. Here, the request of wireless identification information may include the device information of the home appliance 100. Then, the server 300 may store the generated wireless identification information and token correspondingly to the device information of the home appliance 100.

Then, the server 300 may receive the device information of the home appliance 100 from the terminal device 200. Here, the device information of the home appliance 100 may be a serial number or a UUID. Alternatively, the server 300 may receive a QR code image from the terminal device 200, and acquire the device information from the QR code image.

Then, the server 300 may transmit the wireless identification information corresponding to the received device information of the home appliance 100 to the terminal device 200.

Then, when the server 300 receives a token from the terminal device 200, the server 300 may compare the received token with the stored tokens. If, as a result of comparison, the same token is found, the server 300 may identify the home appliance 100 corresponding to the token, and grant a right to manage regarding the identified home appliance 100 to the terminal device 200.

Alternatively, when the server 300 receives a token from the terminal device 200, the server 300 may identify whether the received token matches the device information of the home appliance 100 included in the QR code image received from the terminal device 200, and if matching is identified, the server 300 may grant a right to manage regarding the home appliance 100 to the terminal device 200.

The detailed operations and components of the server 300 as above will be described later with reference to FIG. 6 and FIG. 7.

Meanwhile, in describing FIG. 1, a form wherein the home appliance 100 is connected to one terminal device 200 was explained, but a plurality of terminal devices 200 may be connected to one home appliance 100, or a plurality of home appliances 100 may be connected to one terminal device 200.

Figure 2:
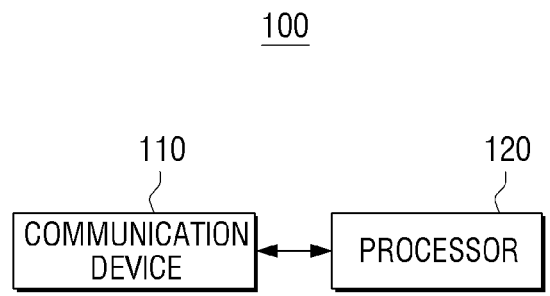
FIG. 2 is a block diagram for illustrating a schematic configuration of a home appliance according to an embodiment of the disclosure.

FIG. 2 is a block diagram for illustrating a schematic configuration of a home appliance according to an embodiment of the disclosure.

Referring to FIG. 2, the home appliance 100 includes a communication device 110 and a processor 120.

The communication device 110 is connected to an external device (not shown), and performs communication with the external device by using a plurality of communication methods.

Specifically, the communication device 110 may perform communication with an external device by using a communication method using a mobile communication network. Here, the mobile communication network may correspond to a Low Power Wireless Network (LPWN) and a Low Power Wide Area Network (LPWAN) such as NB-IoT, LoRa, SigFox, and LTE-CAT1 as well as 3G, LTE, and 5G. Also, the communication device 110 may perform communication by using a communication method using a wireless local area network (LAN) such as WiFi 802.11a/b/g/n as well as a wired LAN. Other than the above, the communication device 110 may perform communication with an external device by using communication methods such as NFC and Bluetooth.

For this, the communication device 110 may include a mobile communication network communication driver and a wireless LAN communication driver, etc.

Also, the communication device 110 may provide a Station mode function for accessing an access point. In addition, the communication device 110 may provide an access point (AP) mode function wherein it performs a role of an access point by itself. Here, the AP mode may be a Hidden AP mode wherein the SSID is not known.

The processor 120 controls the home appliance 100. Specifically, the processor 120 may control the respective components of the home appliance 100 according to control commands of a user. For example, in case the home appliance 100 is a washing machine, if the processor 120 receives a spin-drying command, the processor 120 may control the operation of the motor (not shown) to provide a rotational force to the drum accommodating the laundry.

Then, the processor 120 may control the communication device 110 to perform communication via the first communication method. Here, the first communication method may be a communication method using a mobile communication network. In the case of using a mobile communication network, a separate wireless configuration operation is not needed. Thus, the processor 120 may perform status report of the home appliance 100 for the management server and firmware update, etc. via the first communication method without a separate wireless configuration operation.

However, in the case of performing communication by using only a mobile communication network, there is a disadvantage that the speed is slow and the communication cost is high. Thus, the processor 120 may also utilize together a communication method using a wireless LAN wherein the speed is fast and the communication cost is low. Hereinafter, a wireless configuration method for the processor 120 to perform communication by using a wireless LAN will be described.

Then, the processor 120 may receive wireless identification information of the home appliance 100 from the server 300 via the first communication method. Here, the first communication method may be a communication method using a mobile communication network.

Here, the wireless identification information of the home appliance 100 means information including at least one of the SSID or the password of the home appliance 100. Also, the SSID and the password of the home appliance 100 may be values that the server 300 randomly generated, but not predetermined values.

Then, the processor 120 may control the communication device 110 to operate in an access point (AP) mode by using the received wireless identification information of the home appliance 100. Specifically, the processor 120 may control the communication device 110 to operate in an access point (AP) mode wherein the second communication method is used by using the SSID and the password of the home appliance 100.

Here, the second communication method may be a communication method using Wi-Fi Direct. Also, the AP mode may be a Hidden AP mode wherein the SSID is not known. As the communication device 110 operates in a Hidden AP mode, the SSID of the home appliance 100 is not known, and thus access to the home appliance 100 by an outsider who is not the actual user can be prevented.

Then, as the communication device 110 operates in an AP mode wherein it performs a role of an access point, the processor 120 may be connected to the terminal device 200 via the second communication method.

Specifically, when the processor 120 receives the wireless identification information from the terminal device 200 via the second communication method, the processor 120 may compare the wireless identification information received from the terminal device 200 with the wireless identification information received from the server 300. Then, if, as a result of comparison, the two informations are the same, the processor 120 may establish wireless connection with the terminal device 200 via the second communication method, and if the two informations are different, the processor 120 may not establish wireless connection with the terminal device 200.

Then, when wireless connection with the terminal device 200 via the second communication method is established, the processor 120 may receive wireless configuration information for the access point 400 to which the terminal device 200 is connected from the terminal device 200 via the second communication method. Here, the wireless configuration information may include at least one of the SSID or the password of the access point 400.

Then, the processor 120 may control the communication device 110 to access the access point 400 by using the received wireless configuration information. Specifically, the processor 120 may control the communication device 110 to convert from an AP mode to a Station mode. Then, the processor 120 may control the communication device 110 to access the access point 400 via the third communication method by using at least one information between the SSID and the password of the access point 400 received. Here, the third communication method may be a communication method using a wireless LAN.

Then, when wireless connection with the access point 400 via the third communication method is established, the processor 120 may control the communication device 110 to perform communication preferably by the third communication method using a wireless LAN rather than by the first communication method using a mobile communication network.

Also, when the processor 120 receives the wireless identification information of the home appliance 100 from the server 300 via the first communication method, the processor 120 may further receive a token corresponding to the home appliance 100. Here, the token corresponding to the home appliance 100 may be used when determining whether the server 300 will grant a right to manage regarding the home appliance 100 to a specific terminal device. Also, the token may consist of a value that the server 300 randomly generates, and that is impossible to be inferred, but not a predetermined value.

In addition, when wireless connection with the terminal device 200 via the second communication method is established while the communication device 110 operates in an AP mode, the processor 120 may control the communication device 110 to transmit the corresponding token of the home appliance 100 to the terminal device 200. Then, the terminal device 200 may acquire a right to manage regarding the home appliance 100 from the server 300 by using the received token.

As described above, the home appliance 100 according to the disclosure may perform communication by using a mobile communication network without accessing the access point 400. Also, as the home appliance 100 operates in a Hidden AP mode by using wireless identification information randomly generated at the server 300, the problem in terms of security that the SSID of the home appliance 100 is known can be prevented.

Meanwhile, in illustrating and describing FIG. 1, it was described that a home appliance is connected with one terminal device via the second communication method, and receives wireless configuration information of the access point from the one terminal device, but in actual implementation, a home appliance may be implemented in a manner of being connected with a plurality of terminal devices via the second communication method, and receiving wireless configuration information of the access point from the plurality of respective terminal devices.

Also, in the above, only simple components constituting the home appliance were illustrated and described, but in actual implementation, various components may additionally be provided. Explanation in this regard will be made below with reference to FIG. 3.

Figure 3:
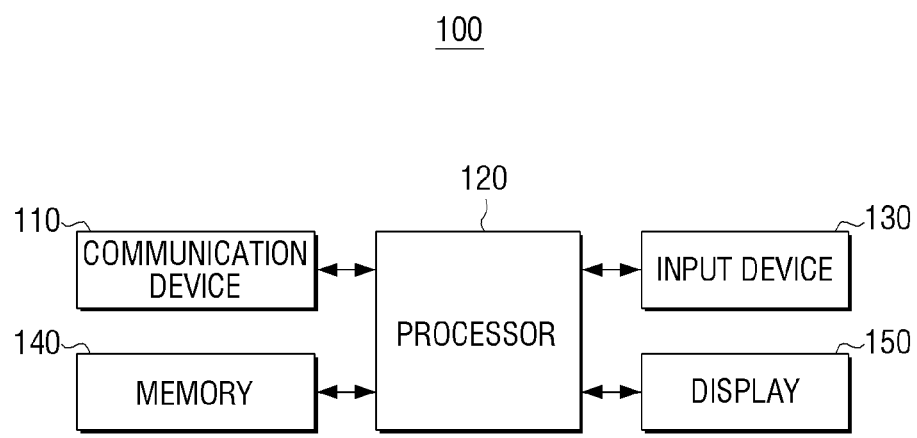
FIG. 3 is a block diagram illustrating a detailed configuration of a home appliance according to an embodiment of the disclosure.

FIG. 3 is a block diagram illustrating a detailed configuration of a home appliance according to an embodiment of the disclosure.

Referring to FIG. 3, the home appliance 100 according to an embodiment of the disclosure may consist of a communication device 110, a processor 120, an input device 130, a memory 140, and a display 150.

As the communication device 110 performs the same function as the component in FIG. 2, overlapping explanation will be omitted. Also, as the processor 120 was described with reference to FIG. 2, the content described in FIG. 2 will not be repetitively described, and only the content related to the components added in FIG. 3 will be described below.

The input device 130 may include a plurality of function keys through which a user can set or select various kinds of functions supported at the home appliance 100. Through this, a user may input various kinds of control commands regarding the home appliance 100. For example, in case the home appliance 100 is a washing machine, a user may input a spin-drying command of the washing machine through the input device 130.

Also, the input device 130 may include a function key commanding conversion to a Station mode or to an AP mode. The home appliance 100 may usually operate in a Station mode for accessing to an access point. However, if a command for conversion to an AP mode for receiving wireless configuration information of an access point is input from a user through the input device 130, the home appliance 100 may perform a series of operations for converting to the AP mode.

Specifically, if a command for conversion to the AP mode is input, the processor 120 may transmit a request signal of identification information to the server 300 via the first communication method. Here, the request signal of identification information is a signal requesting wireless identification information of the home appliance 100, and it may include the device information of the home appliance 100.

Here, the device information is unique information that can be used for specifying the home appliance. For example, the device information may include a unique serial number or a Universally Unique Identifier (UUID), but is not limited thereto.

Then, the processor 120 may receive the wireless identification information of the home appliance 100 from the server 300. Here, the wireless identification information of the home appliance 100 may be a value that is randomly generated by the server 300. In case the wireless identification information is randomly generated, the wireless identification information of the home appliance 100 may respectively vary according to a time point of requesting the wireless identification information.

Then, the processor 120 may control the communication device 110 to operate in the AP mode by using the received wireless identification information.

The memory 140 stores various data for the overall operations of the home appliance 100 such as programs for processing or control of the processor 120, etc. Specifically, the memory 140 may store a number of application programs driven at the home appliance 100, and data and commands for the operations of the home appliance 100.

Also, the memory 140 may store the device information of the home appliance. In addition, the memory 140 may store the wireless identification information of the home appliance 100 received from the server 300 via the first communication method, and a token corresponding to the home appliance 100.

The display 150 may display various kinds of information provided at the home appliance 100. Specifically, the display 150 may display an operation state of the home appliance 100, or a user interface window for selecting a function and an option selected by a user.

For example, in case the home appliance 100 is a washing machine, the display 150 may display that the washing machine is performing a spin-drying operation, or display an interface window so that a user can select for how many minutes a spin-drying operation will be operated.

Also, the display 150 may display the current connection state of communication of the home appliance 100. Specifically, the display 150 may display whether the communication device 110 is currently performing communication by using the first communication method or performing communication by using the third communication method.

In addition, the display 150 may display whether the home appliance 100 is operating in the Station mode or the AP mode.

In the past, a home appliance performed communication using only a mobile communication network or performed communication using only a wireless LAN. However, in the case of using only a mobile communication network, there was a disadvantage that the speed was slow and the communication cost was high. Also, in the case of using only a wireless LAN, there was a problem in terms of security that the SSID of the home appliance is known in the process of accessing a terminal device for connecting to the wireless LAN.

In contrast, as described above, the home appliance according to an embodiment of the disclosure can perform communication using both a mobile communication network and a wireless LAN. Thus, the home appliance can selectively change the communication method depending on circumstances. Also, the home appliance operates in the Hidden AP mode using wireless identification information randomly generated at the server for connecting to a wireless LAN, and thus a problem in terms of security that the SSID of the home appliance is known can be prevented. In addition, a token received from the server is transmitted only to a terminal device that accessed the home appliance operating in the AP mode, and thus an actual user who is around the home appliance can safely acquire a right to manage regarding the home appliance.

Figure 4:
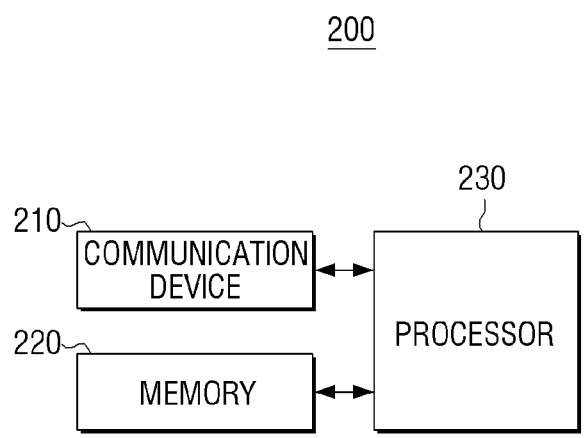
FIG. 4 is a block diagram for illustrating a schematic configuration of a terminal device according to an embodiment of the disclosure.

FIG. 4 is a block diagram for illustrating a schematic configuration of a terminal device according to an embodiment of the disclosure.

Referring to FIG. 4, a terminal device 200 according to an embodiment of the disclosure includes a communication device 210, a memory 220, and a processor 230.

The communication device 210 is connected with an external device (not shown), and performs communication with the external device by using a plurality of communication methods.

Specifically, the communication device 210 may perform communication with an external device by using a communication method using a mobile communication network.

Here, the mobile communication network may correspond to a Low Power Wireless Network (LPWN) and a Low Power Wide Area Network (LPWAN) such as NB-IoT, LoRa, SigFox, and LTE-CAT1 as well as 3G, LTE, and 5G. Also, the communication device 210 may perform communication by using a communication method using a wireless local area network (LAN) such as WiFi 802.11a/b/g/n as well as a wired LAN. Other than the above, the communication device 210 may perform communication with an external device by using communication methods such as NFC and Bluetooth.

The memory 220 stores various data for the overall operations of the terminal device 200 such as programs for processing or control of the processor 230, etc. Specifically, the memory 220 may store a number of application programs driven at the terminal device 200, and data and commands for the operations of the terminal device 200.

Also, the memory 220 may store wireless configuration information for the access point 400 that the terminal device 200 accessed. In case the terminal device 200 has a history of accessing a plurality of access points, the memory 220 may store wireless configuration information for the plurality of respective access points. The wireless configuration information may include at least one of the SSID or the password of the access point.

The processor 230 controls the terminal device 200. Specifically, the processor 230 may control the respective components of the terminal device 200 according to control commands of a user.

Also, the processor 230 may acquire device information of the home appliance 100. Specifically, the processor 230 may acquire device information of the home appliance 100 by receiving input of device information of the home appliance 100 from a user through the input device 240, or photographing the QR code of the home appliance 100 through the camera 250. Meanwhile, methods of acquiring the device information of the home appliance 100 are not limited to the aforementioned examples.

Then, the processor 230 may control the communication device 210 to transmit the acquired device information of the home appliance 100 to the server 300. Specifically, the processor 230 may control the communication device 210 to transmit the device information of the home appliance 100 to the server 300 through a mobile communication network. Alternatively, in case the terminal device 200 is connected to the access point 400, the processor 230 may control the communication device 210 to transmit the device information of the home appliance 100 to the server 300 by way of the access point 400. Here, the processor 230 may control the communication device 210 to transmit the account information of the terminal device 200 to the server 300 together.

Then, the processor 230 may receive wireless identification information from the server 300. Specifically, the processor 230 may receive wireless identification information corresponding to the device information of the home appliance 100 transmitted from the server.

Then, the processor 230 may access the home appliance 100 via the second communication method by using the received wireless identification information. Here, the second communication method may be a communication method using Wi-Fi Direct.

Specifically, the processor 230 may request wireless connection while transmitting the wireless identification information received from the server 300 to the home appliance 100 operating in the AP mode via the second communication method. Then, when permission is granted for the wireless connection from the home appliance 100, the processor 230 may establish wireless connection with the home appliance 100 via the second communication method.

Then, the processor 230 may control the communication device 210 to transmit wireless configuration information for the access point 400 to the home appliance 100 via the second communication method.

Then, the processor 230 may receive a token corresponding to the home appliance 100 from the home appliance 100 via the second communication method. Then, the processor 230 may transmit the received token to the server 300 again and request a right to manage regarding the home appliance 100. Then, when the processor 230 is granted a right to manage regarding the home appliance 100 from the server 300, the processor 230 may perform management for the home appliance 100 through communication.

Meanwhile, in the above, only simple components constituting the terminal device were illustrated and described, but in actual implementation, various components may additionally be provided. Explanation in this regard will be made below with reference to FIG. 5.

Figure 5:
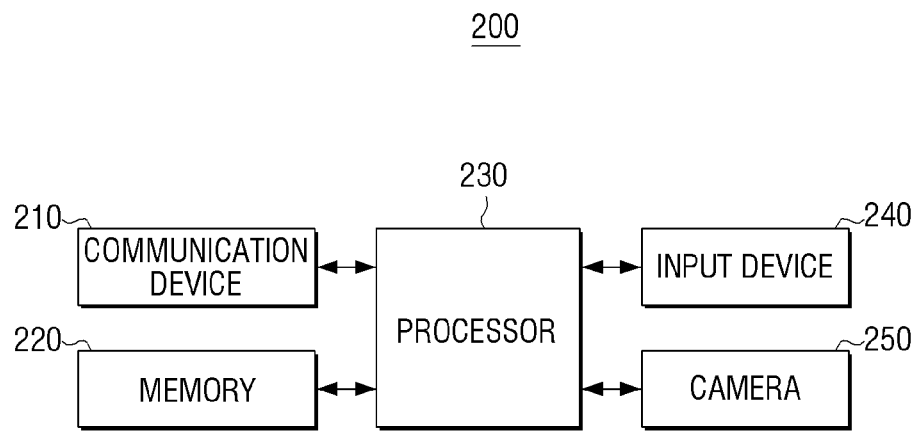
FIG. 5 is a block diagram illustrating a detailed configuration of a terminal device according to an embodiment of the disclosure.

FIG. 5 is a block diagram illustrating a detailed configuration of a terminal device according to an embodiment of the disclosure.

Referring to FIG. 5, the terminal device 200 according to an embodiment of the disclosure may consist of a communication device 210, a memory 220, a processor 230, an input device 240, a camera 250, and a display 260.

As the communication device 210 and the memory 220 perform the same functions as the components in FIG. 4, overlapping explanation will be omitted. Also, as the processor 230 was described with reference to FIG. 4, the content described in FIG. 4 will not be repetitively described, and only the content related to the components added in FIG. 5 will be described below.

The input device 240 may include a plurality of function keys through which a user can set or select various kinds of functions supported at the terminal device 200.

Also, the input device 240 may receive input of device information of the home appliance 100 from a user. Here, the device information is unique information that can be used for specifying the home appliance. For example, the device information may include a unique serial number or a Universally Unique Identifier (UUID), but is not limited thereto.

The camera 250 acquires a photographing image for a predetermined area corresponding to a photographing direction. Specifically, the camera 250 may be arranged on the front surface or the rear surface of the terminal device 200 and acquire a photographing image for a predetermined area corresponding to a photographing direction.

Also, the camera 250 may photograph the QR code of the home appliance 100 and acquire a photographing image for the QR code. Then, the processor 230 may store the acquired QR code image in the memory 220 as the device information of the home appliance 100, and transmit the image to the server 300.

The display 260 may display various kinds of information provided at the terminal device 200. Specifically, the display 260 may display an operation state of the terminal device 200, or a user interface window for selecting a function and an option selected by a user.

Then, the display 260 may display a user interface window through which a user can input the device information of the home appliance 100. Then, the display 260 may display an area that a user wishes to photograph through the camera 250, and display a QR code image photographed through the camera 250.

Then, in case there are a plurality of access points that can be accessed, the display 260 may display a user interface window through which one of the plurality of access points is selected by the user.

Then, when the user selects one access point, the processor 230 may control the communication device 210 to access the selected access point.

Then, in case the memory 220 stores wireless configuration information for the plurality of access points, the display 260 may display a user interface window through which one of the plurality of access points is selected by the user.

Also, when the user selects one access point, the processor 230 may control the communication device 210 to transmit wireless configuration information for the selected access point to the home appliance 100 via the second communication method.

In the past, in case device information of a home appliance such as a serial number or a QR code was exposed, there was a problem in terms of security that an outsider who is not the actual user can acquire a right to manage regarding the home appliance.

In contrast, as described above, the terminal device according to an embodiment of the disclosure may transmit device information of a home appliance to a server, receive wireless identification information of the home appliance from the server, access the home appliance by using the received wireless identification information, and acquire a right to manage the home appliance from the server by using a token received from the home appliance. Thus, the terminal device may safely acquire a right to manage regarding the home appliance limited to an actual user who is around the home appliance.

Figure 6:
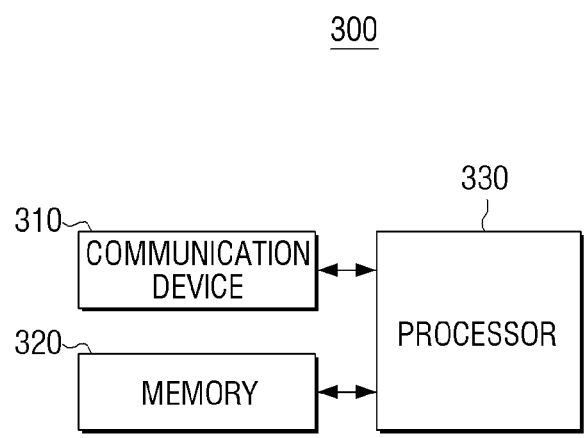
FIG. 6 is a block diagram illustrating a schematic configuration of a server according to an embodiment of the disclosure.

FIG. 6 is a block diagram illustrating a schematic configuration of a server according to an embodiment of the disclosure.

Referring to FIG. 6, the server 300 includes a communication device 310, a memory 320, and a processor 330.

The communication device 310 is connected with an external device (not shown), and performs communication with the external device by using a plurality of communication methods.

Specifically, the communication device 310 may perform communication with an external device by using a communication method using a mobile communication network. Here, the mobile communication network may correspond to a Low Power Wireless Network (LPWN) and a Low Power Wide Area Network (LPWAN) such as NB-IoT, LoRa, SigFox, and LTE-CAT1 as well as 3G, LTE, and 5G. Also, the communication device 310 may perform communication by using a communication method using a wireless local area network (LAN) such as WiFi 802.11a/b/g/n as well as a wired LAN. Other than the above, the communication device 310 may perform communication with an external device by using communication methods such as NFC and Bluetooth.

Also, the communication device 310 may perform communication with a plurality of terminal devices or a plurality of home appliances.

The memory 320 stores various data for the overall operations of the server 300 such as programs for processing or control of the processor 330, etc. Specifically, the memory 320 may store a number of application programs driven at the server 300, and data and commands for the operations of the server 300.

Also, the memory 320 may store device information of a plurality of home appliances. Here, the plurality of device information is unique information that can be used for specifying the plurality of respective home appliances. For example, the device information may include a unique serial number or a Universally Unique Identifier (UUID), but is not limited thereto.

The processor 330 controls the server 300. Specifically, the processor 330 may control the respective components of the server 300 according to control commands of a user.

In addition, when the processor 330 receives a request signal of identification information from the home appliance 100, the processor 330 may transmit wireless identification information corresponding to the home appliance 100 to the home appliance 100. The wireless identification information means information including at least one of the SSID or the password of the home appliance 100.

Specifically, the processor 330 may generate wireless identification information corresponding to the home appliance 100, i.e., an SSID and a password randomly, and transmit the generated wireless identification information to the home appliance 100. Then, the processor 330 may store the generated wireless identification information in the memory 320 correspondingly to the device information of the home appliance 100.

Here, the processor 330 may generate a token corresponding to the home appliance 100, and additionally transmit the generated token to the home appliance 100. Here, the token corresponding to the home appliance 100 may be used when determining whether the server 300 will grant a right to manage regarding the home appliance 100 to a specific terminal device. Also, the token may consist of a value that the server 300 randomly generates, and that is impossible to be inferred, but not a predetermined value. Then, the processor 330 may store the generated token in the memory 320 correspondingly to the device information of the home appliance 100.

Then, when the processor 330 receives the device information of the home appliance 100 from the terminal device 200, the processor 330 may transmit wireless identification information corresponding to the home appliance 100 to the terminal device 200.

Specifically, when the processor 330 receives device information such as a serial number or a UUID from the terminal device 200, the processor 330 may identify the home appliance 100 corresponding to the received device information, and transmit the wireless identification information of the home appliance 100 stored in the memory 320.

Alternatively, when the processor 330 receives a QR code image from the terminal device 200, the processor 330 may acquire device information from the QR code, identify the home appliance 100 corresponding to the acquired device information, and transmit the wireless identification information of the home appliance 100 stored in the memory 320.

Then, the processor 330 may additionally receive the account information of the terminal device 200 at the same time as receiving the device information of the home appliance 100 from the terminal device 200.

Then, when the processor 330 receives a token from the terminal device 200, the processor 330 may grant a right to manage the home appliance 100 corresponding to the token to the terminal device 200.

Specifically, when the processor 330 receives a token from the terminal device 200, the processor 330 may compare the received token with the tokens stored in the memory 320. If, as a result of comparison, the same token is found, the processor 330 may identify the home appliance 100 corresponding to the token, and grant a right to manage regarding the identified home appliance 100 to the terminal device 200.

Alternatively, when the processor 330 receives a token from the terminal device 200, the processor 330 may identify whether the received token matches the device information of the home appliance 100 included in the QR code image received from the terminal device 200, and if matching is identified, the processor 330 may grant a right to manage regarding the home appliance 100 to the terminal device 200.

Meanwhile, in the above, only simple components constituting the server were illustrated and described, but in actual implementation, various components may additionally be provided. Explanation in this regard will be made below with reference to FIG. 7.

Figure 7:
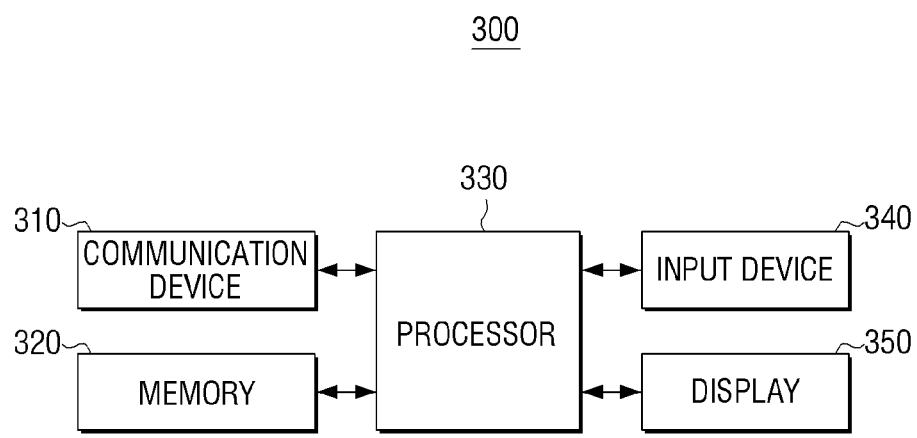
FIG. 7 is a block diagram illustrating a detailed configuration of a server according to an embodiment of the disclosure.

FIG. 7 is a block diagram illustrating a detailed configuration of a server according to an embodiment of the disclosure.

Referring to FIG. 7, the server 300 according to an embodiment of the disclosure may consist of a communication device 310, a memory 320, a processor 330, an input device 340, and a display 350.

As the communication device 310 and the memory 320 perform the same functions as the components in FIG. 6, overlapping explanation will be omitted. Also, as the processor 330 was described with reference to FIG. 6, the content described in FIG. 6 will not be repetitively described, and only the content related to the components added in FIG. 7 will be described below.

The input device 340 may include a plurality of function keys through which a user can set or select various kinds of functions supported at the server 300. Through this, a user may input various kinds of control commands regarding the server 300.

The display 350 may display various kinds of information provided at the server 300. Specifically, the display 350 may display an operation state of the server 300, or a user interface window for selecting a function and an option selected by a user.

Also, the display 350 may display the current connection state of communication of a plurality of home appliances. Specifically, with respect to the plurality of respective home appliances connected to the server 300, the display 350 may display whether communication is currently performed by using the first communication method or communication is performed by using the third communication method.

In the past, in case device information of a home appliance such as a serial number or a QR code was exposed, there was a problem in terms of security that an outsider who is not the actual user can be granted a right to manage regarding the home appliance.

In contrast, as described above, the server according to an embodiment of the disclosure transmits wireless identification information that is randomly generated but not wireless identification information fixed to a home appliance, and thus the server can prevent a problem in terms of security due to exposure of wireless identification information. Also, the server transmits a token that is randomly generated to a home appliance, receives the token from a terminal device, and grants a right to manage regarding the home appliance according to whether the token received from the terminal device matches the token transmitted to the home appliance, and thus a right to manage regarding the home appliance can be granted safely limited to an actual user who is around the home appliance.

Figure 8:
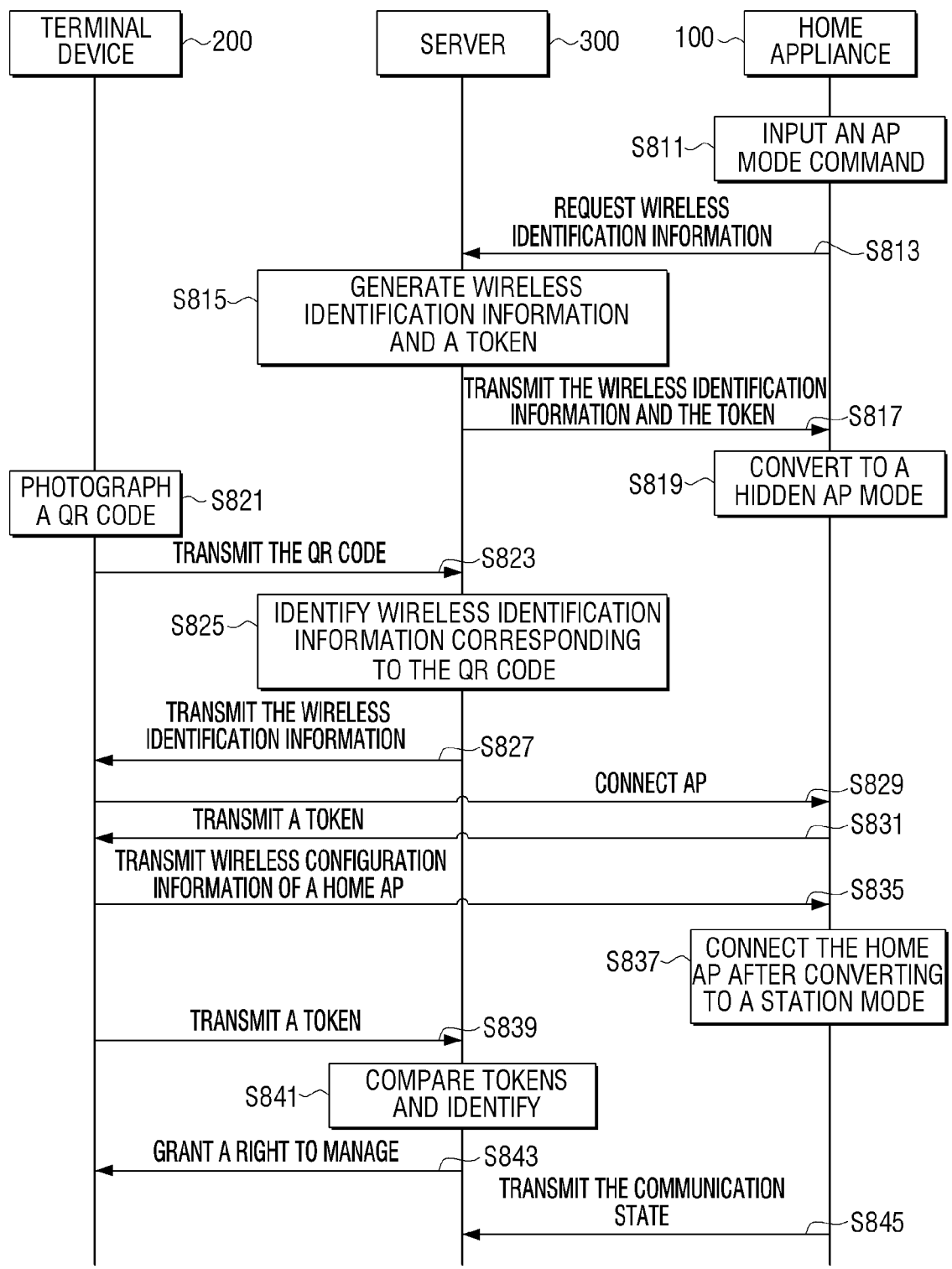
FIG. 8 is a sequence diagram for illustrating a wireless configuration method.

FIG. 8 is a sequence diagram for illustrating a wireless configuration method.

Referring to FIG. 8, first, the home appliance 100 may receive input of a command to convert to an AP mode in operation S811. Specifically, the home appliance 100 may receive input of a command to convert to an AP mode wherein the home appliance 100 can operate as an access point from a user.

Then, the home appliance 100 may request wireless identification information to the server 300 in operation S813. Specifically, the home appliance 100 may transmit a request signal of identification information of the home appliance 100 to the server 300 via the first communication method using a mobile communication network. Here, the wireless identification information means information including at least one of the SSID or the password of the home appliance 100, and the request signal of identification information may include the device information of the home appliance 100.

Then, the server 300 may generate wireless identification information of the home appliance 100 and a token corresponding to the home appliance 100 in operation S815. Here, the generated wireless identification information and token may be generated randomly. Also, the server 300 may identify the device information of the home appliance 100 included in the request signal of identification information, and store the generated wireless identification information and token together with the device information of the home appliance 100.

Then, the server 300 may transmit the generated wireless identification information and token to the home appliance 100 in operation S817. Specifically, the server 300 may transmit the generated wireless identification information and token to the home appliance 100 via the first communication method.

Then, the home appliance 100 may operate in a Hidden AP mode wherein the SSID is not known by using the wireless identification information received from the server 300 in operation S819. Then, the home appliance 100 may perform communication via the second communication method such as Wi-Fi Direct. Then, as the home appliance 100 operates in the Hidden AP mode, only devices that know the SSID and the password of the home appliance 100 may access the home appliance 100.

Then, the terminal device 200 may photograph the QR code of the home appliance 100 in operation S821. The QR code may be attached on the main body, etc. of the home appliance 100, and a user may identify the QR code, and photograph the QR code by using the terminal device 200.

Then, the terminal device 200 may transmit the photographed QR code image of the home appliance 100 to the server 300 in operation S823. Then, the terminal device 200 may transmit the account information of the terminal device 200 to the server 300 together at the same time as transmitting the QR code image.

Then, the server 300 may acquire device information from the QR code image, and identify the home appliance 100 corresponding to the acquired device information in operation S825. Then, the server 300 may transmit the wireless identification information of the identified home appliance 100 in operation S827.

Then, the terminal device 200 may access the home appliance 100 via the second communication method by using the received wireless identification information in operation S829. Specifically, the terminal device 200 may request wireless connection while transmitting the wireless identification information received from the server 300 to the home appliance 100 operating in an AP mode via the second communication method. Then, when permission is granted for the wireless connection from the home appliance 100, the terminal device 200 may establish wireless connection with the home appliance 100 via the second communication method.

Then, the home appliance 100 may transmit a token to the terminal device 200 in operation S831. Specifically, the home appliance 100 may transmit a token corresponding to the home appliance 100 to the terminal device 200 via the second communication method.

Then, the terminal device 200 may transmit wireless configuration information for the access point 400 to the home appliance 100 via the second communication method in operation S835. Here, the wireless configuration information may include at least one of the SSID or the password of the access point 400.

Then, the home appliance 100 may access the access point 400 by using the received wireless configuration information for the access point 400 in operation S837. Specifically, the home appliance 100 may convert from the AP mode to the Station mode, and access the access point 400 via the third communication method by using at least one information between the received SSID or password of the access point 400. Here, the third communication method may be a communication method using a wireless LAN.

Then, the terminal device 200 may transmit the received token to the server 300 again in operation S839. Specifically, the terminal device 200 may transmit the received token corresponding to the home appliance 100 to the server 300, and request a right to manage regarding the home appliance 100.

Then, the server 300 may identify the token received from the terminal device 200, and determine whether to grant a right to manage the home appliance 100 to the terminal device 200 in operation S841.

Specifically, the server 300 may compare the token received from the terminal device 200 with the stored tokens. If, as a result of comparison, the same token is found, the server 300 may identify the home appliance 100 corresponding to the token, and determine to grant a right to manage regarding the identified home appliance 100 to the terminal device 200.

Alternatively, the server 300 may identify whether the token received from the terminal device 200 matches the device information of the home appliance 100 included in the QR code image received from the terminal device 200, and if matching is identified, the server 300 may determine to grant a right to manage regarding the home appliance 100 to the terminal device 200.

Then, the server 300 may grant a right to manage to the terminal device 200 in operation S843. Specifically, the server 300 may grant a right to manage regarding the home appliance 100 corresponding to the received token to the terminal device 200. Then, the server 300 may store the account information of the terminal device 200 to which the right to manage was granted correspondingly to the device information of the home appliance 100.

Then, the home appliance 100 may transmit the connection state of the home appliance 100 to the server 300 in operation S845. Specifically, the home appliance 100 may transmit information on the mobile communication network or the wireless LAN connection state of the home appliance 100 to the server 300. Then, the home appliance 100 may perform communication preferably by the third communication method rather than by the first communication method.

Figure 9:
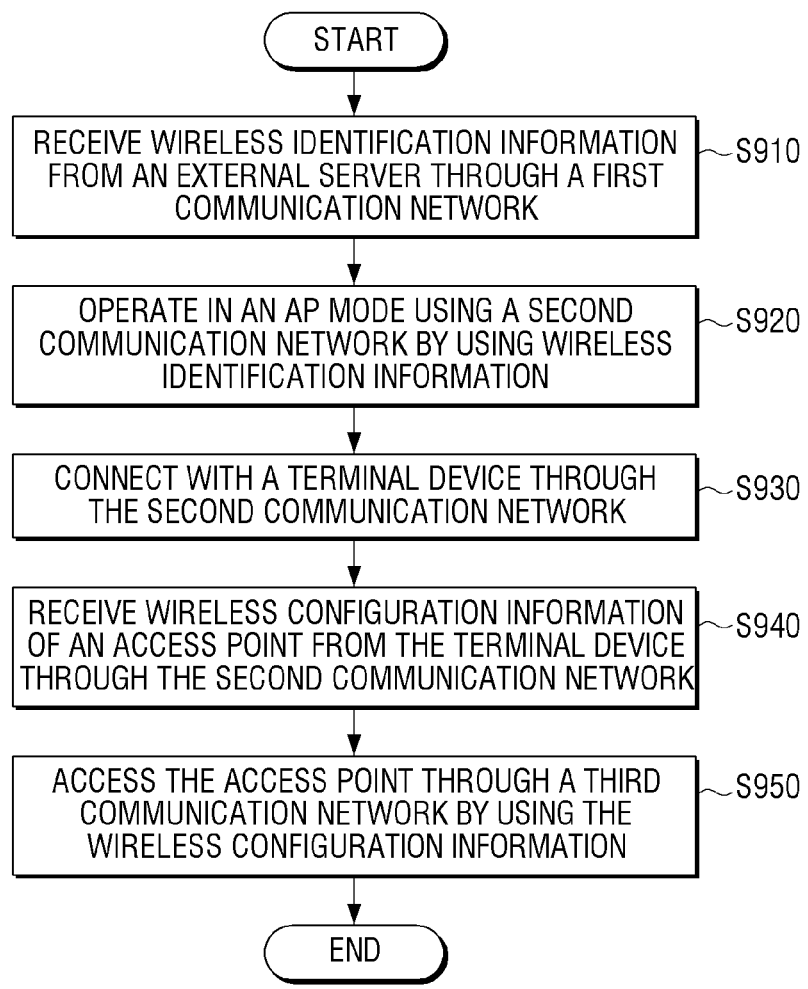
FIG. 9 is a flow chart for illustrating a wireless configuration method of a home appliance according to an embodiment of the disclosure.

FIG. 9 is a flow chart for illustrating a wireless configuration method of a home appliance according to an embodiment of the disclosure.

Referring to FIG. 9, first, wireless identification information of the home appliance is received from the server via the first communication method in operation S910. Here, the first communication method may be a communication method using a mobile communication network. Also, the wireless identification information of the home appliance means information including at least one of the SSID or the password of the home appliance. In addition, the SSID and the password of the home appliance may be values that the server randomly generated, but not predetermined values.

Specifically, if a predetermined event occurs, wireless identification information of the home appliance may be requested to the server via the first communication method, and the wireless identification information of the home appliance may be received from the server. Also, the wireless identification information may include the device information of the home appliance. Here, the device information is unique information that can be used for specifying the home appliance. For example, the device information may include a unique serial number or a Universally Unique Identifier (UUID), but is not limited thereto.

Here, the predetermined event may be an event wherein a command to convert to the AP mode for receiving wireless configuration information of an access point is input from a user, and is not limited to the aforementioned example. Also, the wireless identification information may have different values as the server randomly generates the information, and according to the time point when the home appliance requests the wireless identification information.

Then, the home appliance operates in the Access Point (AP) mode wherein the second communication method is used by using the received wireless identification information of the home appliance in operation S920. Specifically, the home appliance may operate in the Access Point (AP) mode wherein the second communication method is used by using the SSID and the password of the home appliance.

Here, the second communication method may be a communication method using Wi-Fi Direct. Also, the AP mode may be a Hidden AP mode wherein the SSID is not known. Further, as the home appliance operates in the Hidden AP mode, the SSID of the home appliance is not known, and thus a phenomenon that an outsider accesses the home appliance can be prevented.

Then, as the home appliance operates in the AP mode wherein the home appliance performs the role of an access point, the home appliance is connected with the terminal device via the second communication method in operation S930. Specifically, when wireless identification information is received from a terminal device via the second communication method, the wireless identification information received from the terminal device and the wireless identification information received from the server may be compared. Then, if, as a result of comparison, the two informations are the same, wireless connection with the terminal device via the second communication method may be established, and if the two informations are different, wireless connection with the terminal device may not be established.

Then, wireless configuration information for the access point to which the terminal device is connected may be received from the terminal device via the second communication method in operation S940. Here, the wireless configuration information may include at least one of the SSID or the password of the access point.

Then, the home appliance accesses the access point 400 via the third communication method by using the received wireless configuration information in operation S950. Specifically, after converting from the AP mode to the Station mode, the home appliance may access the access point 400 via the third communication method by using at least one information between the received SSID and password of the access point 400. Here, the third communication method may be a communication method using a wireless LAN.

Also, when receiving the wireless identification information of the home appliance 100 via the first communication method, a token corresponding to the home appliance may be further received. Here, the token corresponding to the home appliance may be used when determining whether the server will grant a right to manage regarding the home appliance to a specific terminal device. Also, the token may be a value that the server randomly generated, but not a predetermined value.

Then, when wireless connection with the terminal device via the second communication method is established while operating in the AP mode, the token corresponding to the home appliance may be transmitted to the terminal device.

Accordingly, in the control method of a home appliance according to the disclosure, communication can be performed by using both a mobile communication network and a wireless LAN, and thus the control method has an effect that a communication method can be selectively changed depending on circumstances. Also, for connecting to a wireless LAN, a home appliance operates in a Hidden AP mode by using wireless identification information randomly generated at a server, and thus the control method has an effect that a problem in terms of security that the SSID of the home appliance is known is prevented. In addition, a token received from the server is transmitted only to a terminal device that accessed a home appliance operating in an AP mode, and thus the control method has an effect that only an actual user around the home appliance is made to acquire a right to manage regarding the home appliance safely. The control method as in FIG. 9 can be executed in a home appliance having a configuration as in FIG. 2 or FIG. 3, and it can be also executed in other home appliances having different configurations.

Also, the control method as described above can be implemented as at least one execution program for executing the control method as described above, and such an execution program can be stored in a non-transitory computer-readable medium.

A non-transitory computer readable-medium refers to a medium that stores data semi-permanently, and is readable by machines, but not a medium that stores data for a short moment such as a register, a cache, and a memory. Specifically, the aforementioned various applications or programs may be provided while being stored in a non-transitory computer-readable medium such as a CD, a DVD, a hard disk, a blue-ray disk, a USB, a memory card, a ROM and the like.

Figure 10:
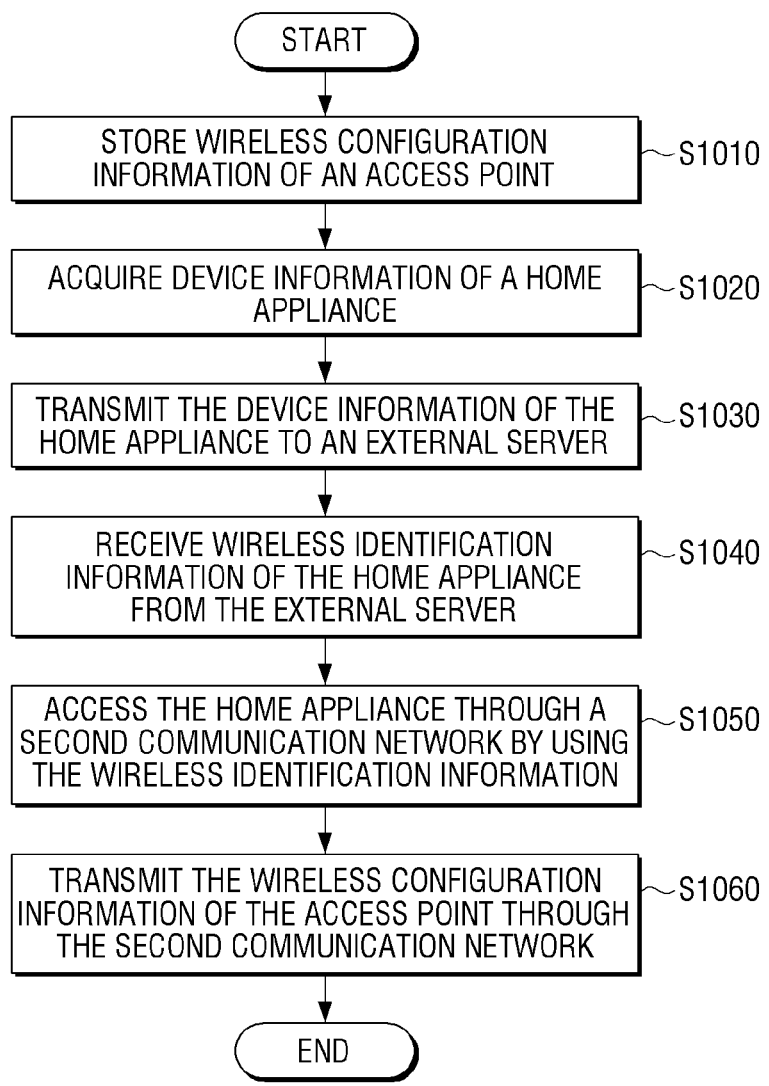
FIG. 10 is a flow chart for illustrating a wireless configuration method of a terminal device according to an embodiment of the disclosure.

FIG. 10 is a flow chart for illustrating a wireless configuration method of a terminal device according to an embodiment of the disclosure.

Referring to FIG. 10, first, wireless configuration information for an access point that a terminal device accessed is stored in operation S1010. In case the terminal device has a history of accessing a plurality of access points, wireless configuration information for the plurality of respective access points may be stored.

Then, device information of a home appliance is acquired in operation S1020. Here, the device information is unique information that can be used for specifying the home appliance. For example, the device information may include a unique serial number or a Universally Unique Identifier (UUID), but is not limited thereto.

Specifically, the device information of the home appliance may be acquired by receiving input of the device information of the home appliance from a user, or by photographing the QR code of the home appliance. Meanwhile, methods of acquiring the device information of the home appliance are not limited to the aforementioned examples.

Then, the acquired device information of the home appliance 100 is transmitted to a server in operation S1030. Specifically, the device information of the home appliance may be transmitted to a server through a mobile communication network. Alternatively, in case the terminal device is connected to an access point, the device information of the home appliance may be transmitted to a server by way of the access point. Here, the account information of the terminal device may be transmitted to the server together.

Then, wireless identification information is received from the server in operation S1040. Specifically, wireless identification information corresponding to the device information of the home appliance transmitted from the server may be received.

Then, the terminal device accesses the home appliance via the second communication method by using the received wireless identification information in operation S1050. Here, the second communication method may be a communication method using Wi-Fi Direct.

Specifically, the terminal device may request wireless connection while transmitting the wireless identification information received from the server to the home appliance operating in an AP mode via the second communication method. Then, when permission is granted for the wireless connection from the home appliance, the terminal device may establish wireless connection with the home appliance via the second communication method.

Then, the terminal device transmits wireless configuration information for the access point to the home appliance via the second communication method in operation S1060.

Then, the terminal device may receive a token corresponding to the home appliance from the home appliance via the second communication method. Then, the terminal device may transmit the received token to the server again, and request a right to manage regarding the home appliance. Then, when the terminal device is granted a right to manage regarding the home appliance from the server, the terminal device may perform management for the home appliance through communication.

Accordingly, in the control method of a terminal device according to the disclosure, the terminal device may transmit device information of a home appliance to a server, receive wireless identification information of the home appliance from the server, access the home appliance by using the received wireless identification information, and acquire a right to manage the home appliance from the server by using a token received from the home appliance. Thus, the control method has an effect of safely acquiring a right to manage regarding the home appliance limited to an actual user who is around the home appliance. The control method as in FIG. 10 can be executed in a home appliance having a configuration as in FIG. 4 or FIG. 5, and it can be also executed in other terminal devices having different configurations.

Also, the control method as described above can be implemented as at least one execution program for executing the control method as described above, and such an execution program can be stored in a non-transitory computer-readable medium.

Figure 11:
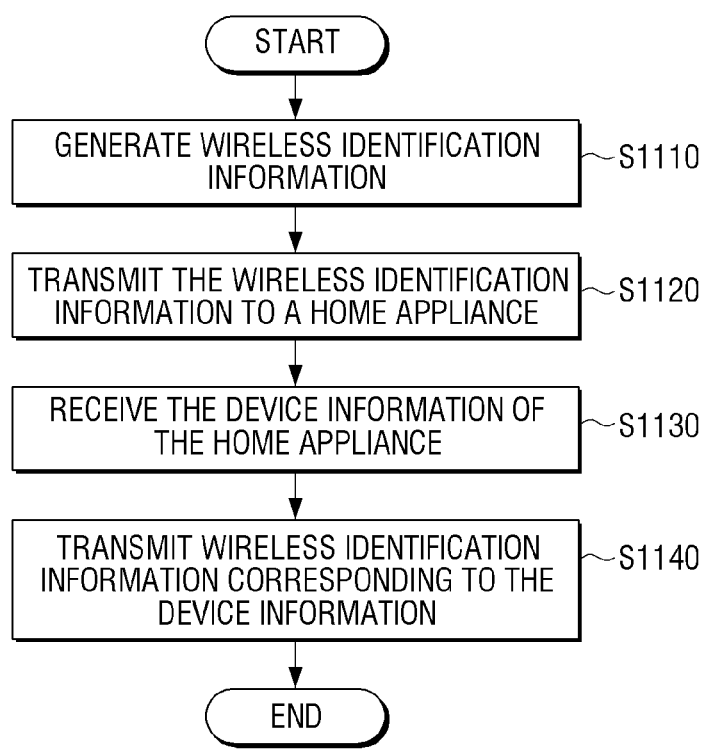
FIG. 11 is a flow chart for illustrating a wireless configuration method of a server according to an embodiment of the disclosure.

FIG. 11 is a flow chart for illustrating a wireless configuration method of a server according to an embodiment of the disclosure.

Referring to FIG. 11, first, wireless identification information corresponding to a home appliance is generated in operation S1110. Specifically, if a request signal of wireless identification information is received from a home appliance via the first communication method, wireless identification information corresponding to the home appliance, i.e., an SSID and a password may be generated randomly.

Then, the generated wireless identification information is transmitted to the home appliance in operation S1120. Then, the transmitted wireless identification information of the home appliance may be stored correspondingly to the device information of the home appliance.

Then, a token corresponding to the home appliance may be generated, and the generated token may be additionally transmitted to the home appliance. Here, the token corresponding to the home appliance may be used when determining whether the server will grant a right to manage regarding the home appliance 100 to a specific terminal device. Also, the token may be a value that the server randomly generated, but not a predetermined value.

Then, device information of the home appliance is received from the terminal device in operation S1130. Specifically, the device information of the home appliance such as a serial number or a UUID, etc. or a QR code image including the device information of the home appliance may be received from the terminal device.

Then, wireless identification information corresponding to the received device information of the home appliance is transmitted to the terminal device in operation S1140.

Then, a token may be received from the terminal device. Then, a right to manage the home appliance corresponding to the token received from the terminal device may be granted.

Specifically, the received token may be compared with the stored tokens. Then, if, as a result of comparison, the same token is found, a home appliance corresponding to the token may be identified, and a right to manage regarding the identified home appliance may be granted to the terminal device.

Alternatively, it may be identified whether the received token matches the device information of the home appliance included in the QR code image received from the terminal device, and if matching is identified, a right to manage regarding the home appliance may be granted to the terminal device.

Accordingly, in the control method of a server according to the disclosure, wireless identification information that is randomly generated, but not wireless identification information fixed to a home appliance, is transmitted, and thus the control method has an effect of preventing a problem in terms of security due to exposure of wireless identification information. Also, a token randomly generated is transmitted to a home appliance, a token is received from a terminal device, and a right to manage regarding the home appliance is granted depending on whether the token received from the terminal device matches the token transmitted to the home appliance, and thus the control method has an effect of safely granting a right to manage regarding the home appliance limited to an actual user who is around the home appliance. The control method as in FIG. 11 can be executed at a server having a configuration as in FIG. 6 or FIG. 7, and it can be also executed in other servers having different configurations.

Also, the control method as described above can be implemented as at least one execution program for executing the control method as described above, and such an execution program can be stored in a non-transitory computer-readable medium.

While preferred embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims, and such modifications are within the scope of the descriptions of the claims.

What is claimed is:

1. A home appliance comprising:
a communication device for performing communication using a plurality of communication methods; and
a processor configured to:
receive wireless identification information comprising at least one of an SSID and a password for connecting to the home appliance from an external server via a first communication method,
control the communication device to operate in a hidden access point (AP) mode in which communication is performed in a second communication method by using the received wireless identification information, wherein the SSID is not known in the hidden AP mode,
based on a terminal device being connected via the second communication method using the wireless identification information of the home appliance, receive wireless configuration information for an access point accessed by the terminal device from the terminal device, and
control the communication device to access the access point via a third communication method by using the received wireless configuration information.

2. The home appliance of claim 1, wherein the processor is configured to:
based on receiving wireless identification information from the terminal device via the second communication method, compare the wireless identification information received from the terminal device with the wireless identification information received from the external server and establish wireless connection with the terminal device.

3. The home appliance of claim 1, wherein:
the first communication method is a communication method using a mobile communication network,
the second communication method is a communication method using Wi-Fi Direct, and
the third communication method is a communication method using a wireless LAN.

4. The home appliance of claim 1, wherein the processor is configured to:
based on a predetermined event occurring, request the wireless identification information of the home appliance to the external server, and receive the wireless identification information of the home appliance from the external server.

5. The home appliance of claim 4, wherein the received wireless identification information varies according to a time point of requesting the wireless identification information.

6. The home appliance of claim 1, wherein the processor is configured to:
  receive a token corresponding to the home appliance from the external server via the first communication method, and
  based on the terminal device being connected via the second communication method, control the communication device to transmit the received token to the terminal device.

7. A terminal device comprising:
  a communication device for performing communication using a plurality of communication methods;
  a memory for storing wireless configuration information for an access point accessed by the terminal device; and
  a processor for, based on acquiring device information of a home appliance, controlling the communication device to transmit the device information to an external server,
  wherein the processor is configured to:
    based on receiving wireless identification information comprising at least one of an SSID and a password for connecting to the home appliance from the external server, control the communication device to access the home appliance which operate in an access point (AP) mode via a second communication method by using the received wireless identification information, and transmit the wireless configuration information for the access point to the home appliance via the second communication method, and
    wherein the AP mode of the home appliance is a mode in which the SSID of the home appliance is hidden.

8. The terminal device of claim 7, wherein the processor is configured to:
  based on receiving a token corresponding to the home appliance from the home appliance via the second communication method, transmit the received token to the external server and acquire a right to manage regarding the home appliance from the external server.

9. A wireless connection method of a home appliance, the method comprising:
  receiving wireless identification information comprising at least one of an SSID and a password for connecting to the home appliance from an external server via a first communication method;
  operating in a hidden access point (AP) mode in which a second communication method is used by using the received wireless identification information, wherein the SSID is not known in the hidden AP mode;
  based on a terminal device being connected via the second communication method using the wireless identification information of the home appliance, receiving wireless configuration information for an access point accessed by the terminal device from the terminal device; and
  accessing the access point via a third communication method by using the received wireless configuration information.

10. The wireless connection method of claim 9, wherein the connecting to the terminal device comprises:
  receiving wireless identification information from the terminal device via the second communication method; and
  comparing the wireless identification information received from the terminal device with the wireless identification information received from the external server and establishing wireless connection with the terminal device.

11. The wireless connection method of claim 9, wherein the first communication method is a communication method using a mobile communication network,
  the second communication method is a communication method using Wi-Fi Direct, and
  the third communication method is a communication method using a wireless LAN.

* * * * *